US010203729B1

United States Patent
Chen et al.

(10) Patent No.: US 10,203,729 B1
(45) Date of Patent: Feb. 12, 2019

(54) PORTABLE ELECTRONIC DEVICE

(71) Applicant: Quanta Computer Inc., Taoyuan (TW)

(72) Inventors: I-Hao Chen, Taoyuan (TW); Chih-Min Chan, Taoyuan (TW); Chun-Ming Yang, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/941,188

(22) Filed: Mar. 30, 2018

(30) Foreign Application Priority Data

Oct. 26, 2017 (TW) .............................. 106136885 A (51) Int. Cl.
 *G06F 1/16* (2006.01)
(52) U.S. Cl.
 CPC .......... *G06F 1/1654* (2013.01); *G06F 1/1616* (2013.01); *G06F 1/1626* (2013.01); *G06F 1/1681* (2013.01)
(58) Field of Classification Search
 CPC .... G06F 1/1616; G06F 1/1626; G06F 1/1681; G06F 1/1679
 See application file for complete search history.

(56) References Cited

FOREIGN PATENT DOCUMENTS

| TW | I528146 A | 12/2015 |
| TW | I535925 A | 6/2016 |

OTHER PUBLICATIONS

Chinese language office action dated Aug. 8, 2018, issued in application No. TW 106136885.

*Primary Examiner* — Hoa C Nguyen
*Assistant Examiner* — Keith DePew
(74) *Attorney, Agent, or Firm* — McClure, Qualey & Rodack, LLP (57) ABSTRACT

A portable electronic device is provided. The portable electronic device includes a display unit, an input unit, and a hinge mechanism. The hinge mechanism is detachably connected the display unit and pivotally connected to the input unit, wherein the hinge mechanism includes a housing, a stopper, and an elastic element. The elastic element connects the housing to the stopper. When the portable electronic device is in a closed state, the stopper is in an initial position relative to the housing. When the display unit and the hinge mechanism are rotated relative to the input unit around a rotation axis and the portable electronic device is in an open state, the elastic element exerts an elastic force on the stopper, and the stopper slides to an outer side relative to the housing from the initial position and partially covers the display unit.

10 Claims, 12 Drawing Sheets

PORTABLE ELECTRONIC DEVICE

CROSS REFERENCE TO RELATED APPLICATIONS

This application claims the benefit of Taiwan Patent Application No. 106136885, filed on Oct. 26, 2017, the entirety of which is incorporated by reference herein.

BACKGROUND OF THE INVENTION

Field of the Invention

The application relates in general to a portable electronic device, and in particular to a portable electronic device with multiple modes of use.

Description of the Related Art

Due to the popularity of tablet computers and touch display screens, users have become accustomed to operating electronic devices by touch. Some laptop computers are equipped with detachable touch display screens (tablets) and are switchable between a laptop (notebook) mode and a tablet mode via a connecting mechanism to facilitate operation by the user. However, although the connecting mechanisms of laptops are suitable for this purpose, they do have some disadvantages, such as when the touch display screen (tablet) is connected to the connecting mechanism, the screen may still swivel too easily, or the connecting mechanism becomes exposed.

BRIEF SUMMARY OF INVENTION

To address the deficiencies of conventional products, an embodiment of the invention provides a portable electronic device that includes a display unit, an input unit and a hinge mechanism. The hinge mechanism is detachably connected to the display unit and is pivotally connected to the input unit, wherein the hinge mechanism includes a housing, a stopper, and an elastic element. The elastic element connects the housing to the stopper. When the portable electronic device is in a closed state, the stopper is in an initial position relative to the housing. When the display unit and the hinge mechanism are rotated relative to the input unit around a rotation axis so that the portable electronic device is in an open state, the elastic element exerts an elastic force on the stopper, and the stopper slides to an outer side relative to the housing from the initial position and partially covers the display unit.

In some embodiments, when the portable electronic device is in the closed state, at least a portion of the stopper is in a recess which is formed by the input unit and the display unit.

In some embodiments, the stopper has a wedge-shaped structure corresponding to the recess.

In some embodiments, the hinge mechanism further has a movable member and a fixing member, the movable member is affixed to the housing, and the fixing member is affixed to the input unit, wherein the fixing member has a protruding structure and the stopper has a protrusion, and the protruding structure is located between the protrusion and the rotation axis in a radial direction of the rotation axis when the portable electronic device is in the open state.

In some embodiments, the protrusion protrudes from a side surface of the stopper.

In some embodiments, when the portable electronic device is in the closed state, the protrusion and the protruding structure are separated by a distance.

In some embodiments, the protruding structure has a curved surface corresponding to the protrusion.

In some embodiments, the hinge mechanism further has a latch that protrudes from the housing and is detachably connected to the display unit.

In some embodiments, the display unit is a tablet computer.

In some embodiments, the portable electronic device further comprises a first magnetic element and a second magnetic element respectively disposed on the stopper and the display unit, and the first and second magnetic elements attract each other when the portable electronic device in the open state.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The embodiments of the present invention will be described with reference to the drawings.

The foregoing and other technical contents, features and utilities of the present invention will be apparent from the following detailed description of a preferred embodiment when taken in conjunction with the accompanying drawings. Directional terms such as up, down, left, right, front, back and the like mentioned in the following embodiments are only directions with reference to the attached drawings. Therefore, the directional terms used are intended to illustrate and not to limit the present invention.

Figure 1A:
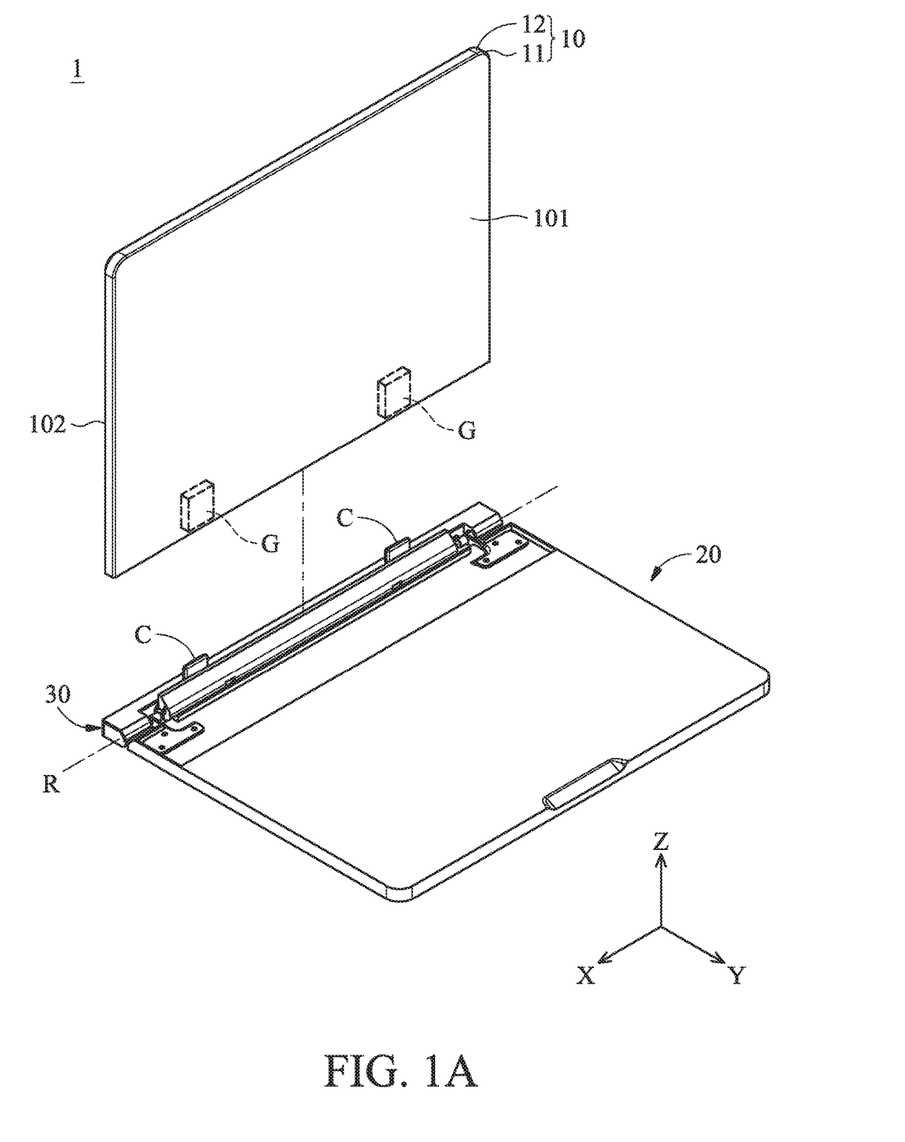
FIG. 1A is an exploded diagram of a display unit and a connecting mechanism of a portable electronic device being a separated state according to an embodiment of the invention.

Referring to FIG. 1A, a portable electronic device 1 is provided according to an embodiment of the present invention. The portable electronic device 1, for example, may be a notebook computer, primarily comprises a display unit 10, an input unit 20 and a hinge mechanism 30. The display unit 10 can be a flat plate structure and configured to display images. In some embodiments, the display unit 10 may be a touch display. The display unit 10 includes a display panel 11 and a frame body 12 connected to each other. The display unit 10 has a front side 101 and a rear side 102. The display panel 11 is located on the front side 101, and the frame body 12 is located on the rear side 102 which is opposite the front side 101. In this embodiment, the display unit 10 can be a tablet computer. The display panel 11 can be used for displaying images or texts on the front side 101, and the display panel 11 can be a touch display panel. The frame body 12 has at least one engaging slot G, wherein a latch C of the hinge mechanism 30 is detachably engaged with the engaging slot G.

The input unit 20 may be a flat plate structure, and a keyboard or a touch panel (not shown) may be disposed on a surface of the input unit 20. In addition, various electronic components (not shown) such as a CPU, a memory, and a motherboard may be disposed inside the input unit 20. After the display unit 10 is combined with the hinge mechanism 30, the display unit 10 can be rotated relative to the input unit 20 around a rotation axis R. In an embodiment, various electronic components, such as a CPU, a memory, and a motherboard, may also be disposed inside the display unit 10.

Figure 1B:
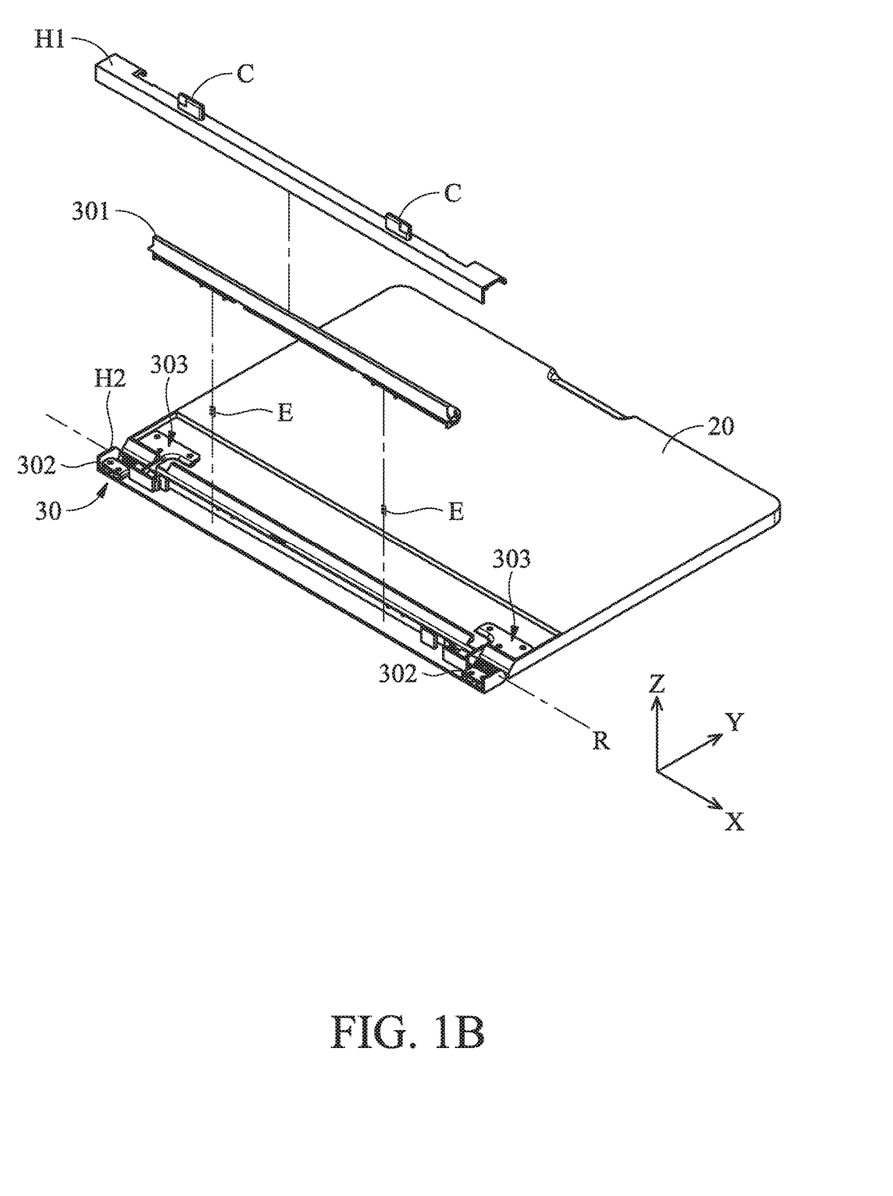
FIG. 1B is a schematic diagram of a portion of the hinge mechanism in FIG. 1A after the display unit is removed.

Referring to FIG. 1B, the hinge mechanism 30 has two housings H1 and H2 affixed to each other, at least one elastic element E, a stopper 301, a movable member 302 and a fixing member 303. The stopper 301 is movably disposed between the display unit 10 and the input unit 20. The elastic element E and a portion of the stopper 301 are situated in the housings H1 and H2. Two sides of the elastic element E connect the housing H2 and the stopper 301 respectively for providing elastic force to the stopper 301, so that the stopper 301 can be pushed to move and protrude outwards from the housing H1. The movable member 302 is fixed to the housing H2, and the fixing member 303 is fixed to the input unit 20. When the display unit 10 and the hinge mechanism 30 rotate relative to the input unit 20 around the rotation axis R, the movable member 301 rotates relative to the fixed member 303 around the rotation axis R.

Figure 2A:
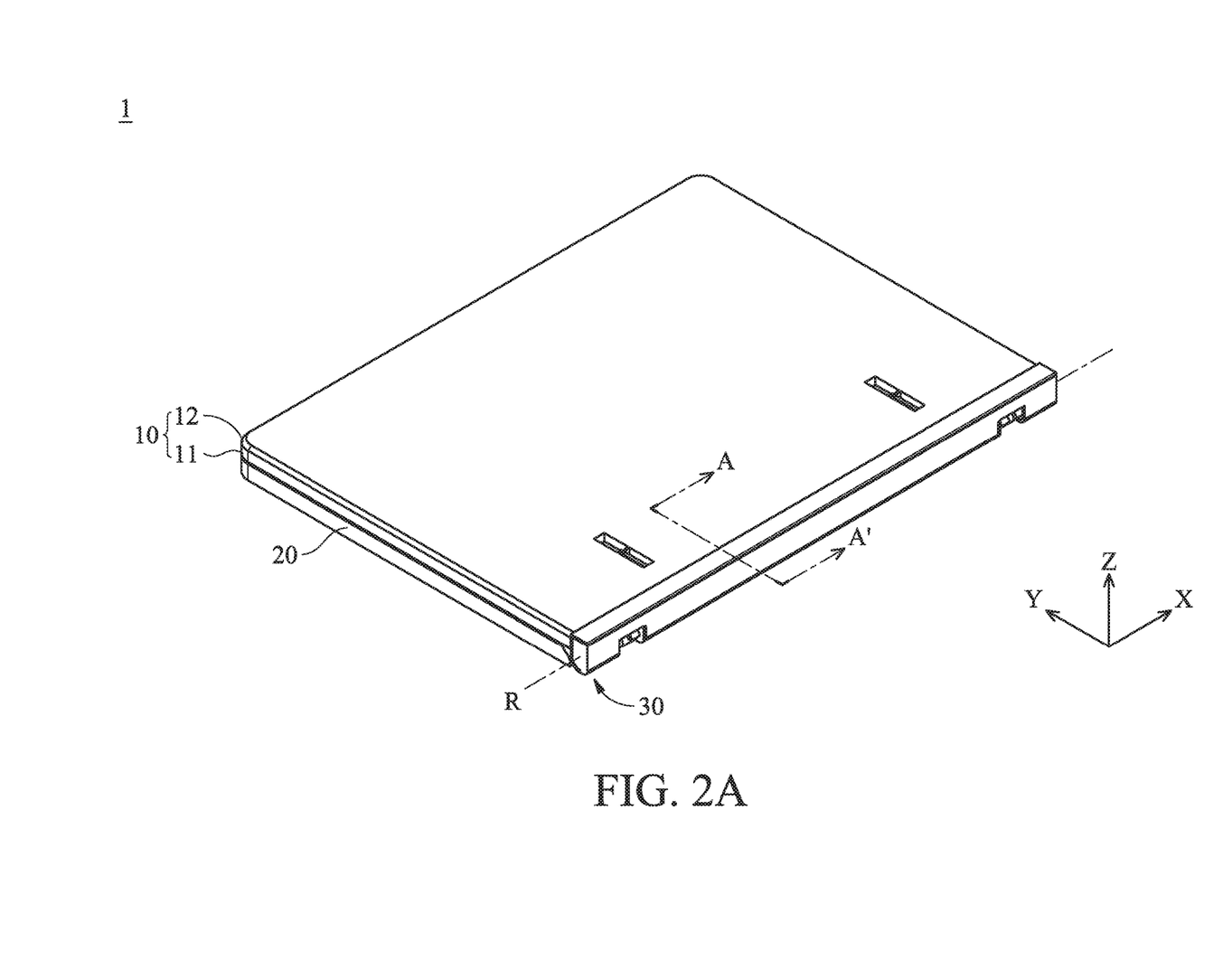
FIG. 2A is a schematic diagram of the portable electronic device in FIG. 1A in a closed state.
Figure 2B:
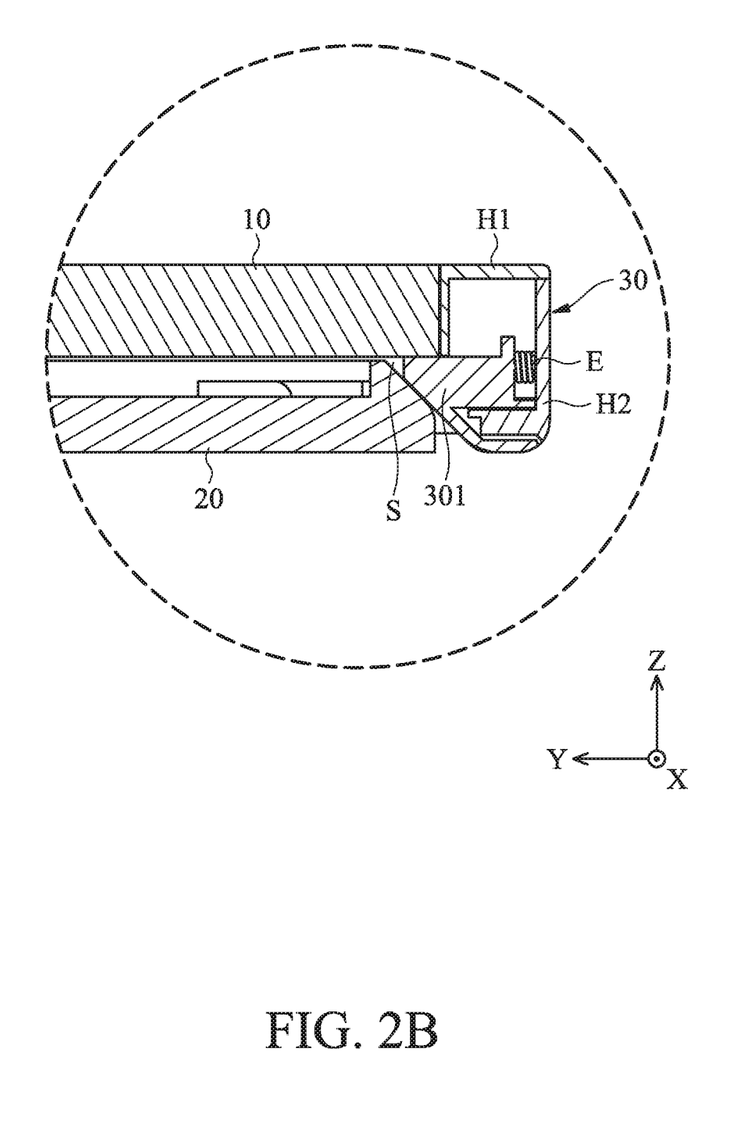
FIG. 2B is sectional view diagram taken along line A-A' in FIG. 2A.

Referring to FIGS. 2A and 2B, FIG. 2A is a perspective view of the portable electronic device 1 in the closed state, and FIG. 2B is a schematic cross-sectional view taken along line A-A' in FIG. 2A. When the portable electronic device 1 is in the closed state, the stopper 301 is located at an initial position (as shown in FIG. 2B) relative to the housing H2, the elastic element E is compressed in the Y-axis direction, and at least a portion of the stopper 301 is retracted into (received in) the housing H1 and hidden in the recess S formed between the input unit 20 and the display unit 10. The stopper 301 has a wedge structure corresponding to the recess S.

Figure 2C:
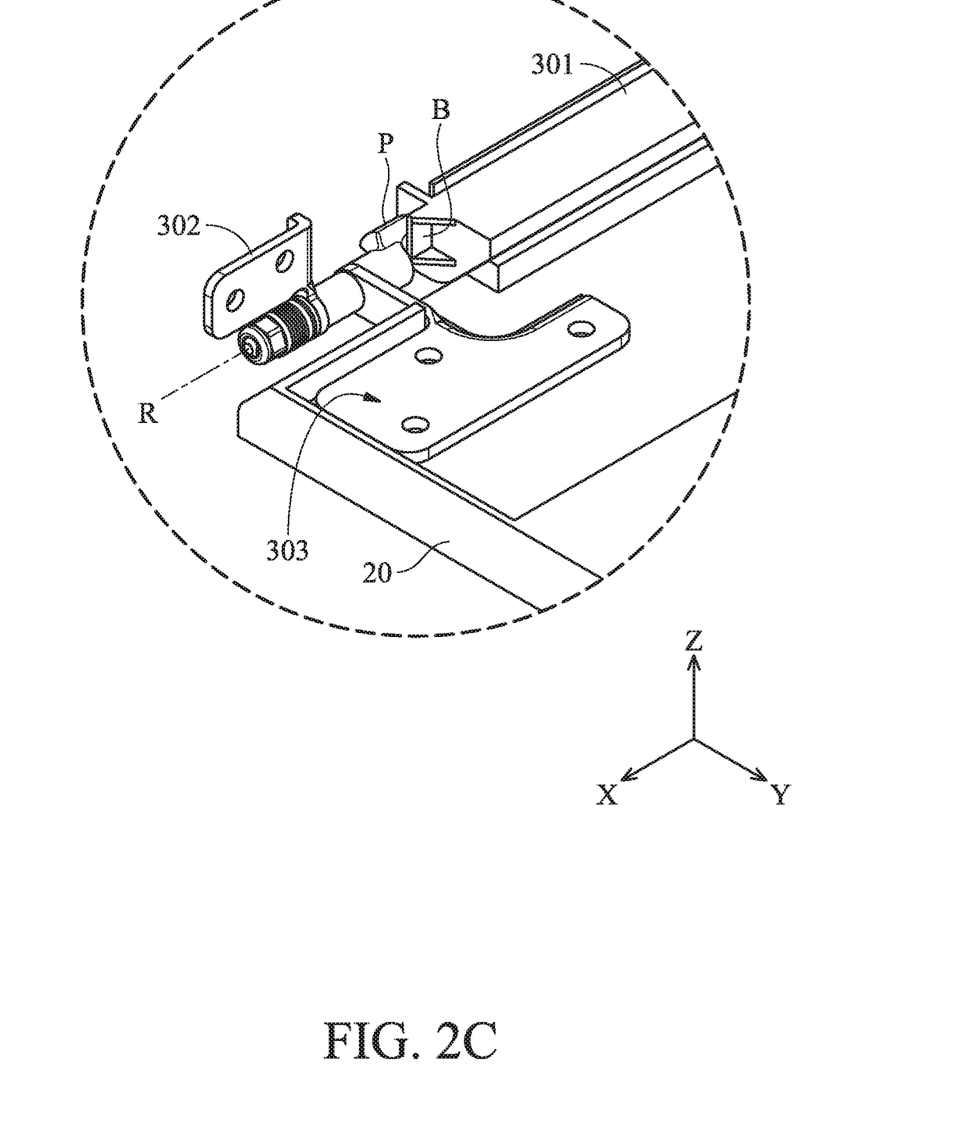
FIG. 2C is a schematic diagram of the hinge mechanism and the input unit of the portable electronic device in FIG. 2A being connected after the display unit and the housing is removed.

Please refer to FIG. 2C, which is a schematic diagram of the connection between the hinge mechanism 30 and the input unit 20 after the display unit 10 and the housings H1 and H2 of the portable electronic device 1 in FIG. 2A have been removed. As shown, the stopper 301 has a protrusion B formed on a side surface of the stopper 301, and the rotation axis R is substantially perpendicular to the side surface. In addition, the fixing member 303 has a protruding structure P which has a curved surface. When the portable electronic device 1 is in the closed state, the movable member 302 is in a vertical state, and the protrusion B and the protruding structure P are separated by a distance. In this case, the stopper 301 abuts against the inclined surface of the recess S and is hidden in the recess S, in order to avoid the protrusion B and the protruding structure P interfering with each other and making it difficult to close.

Figure 3A:
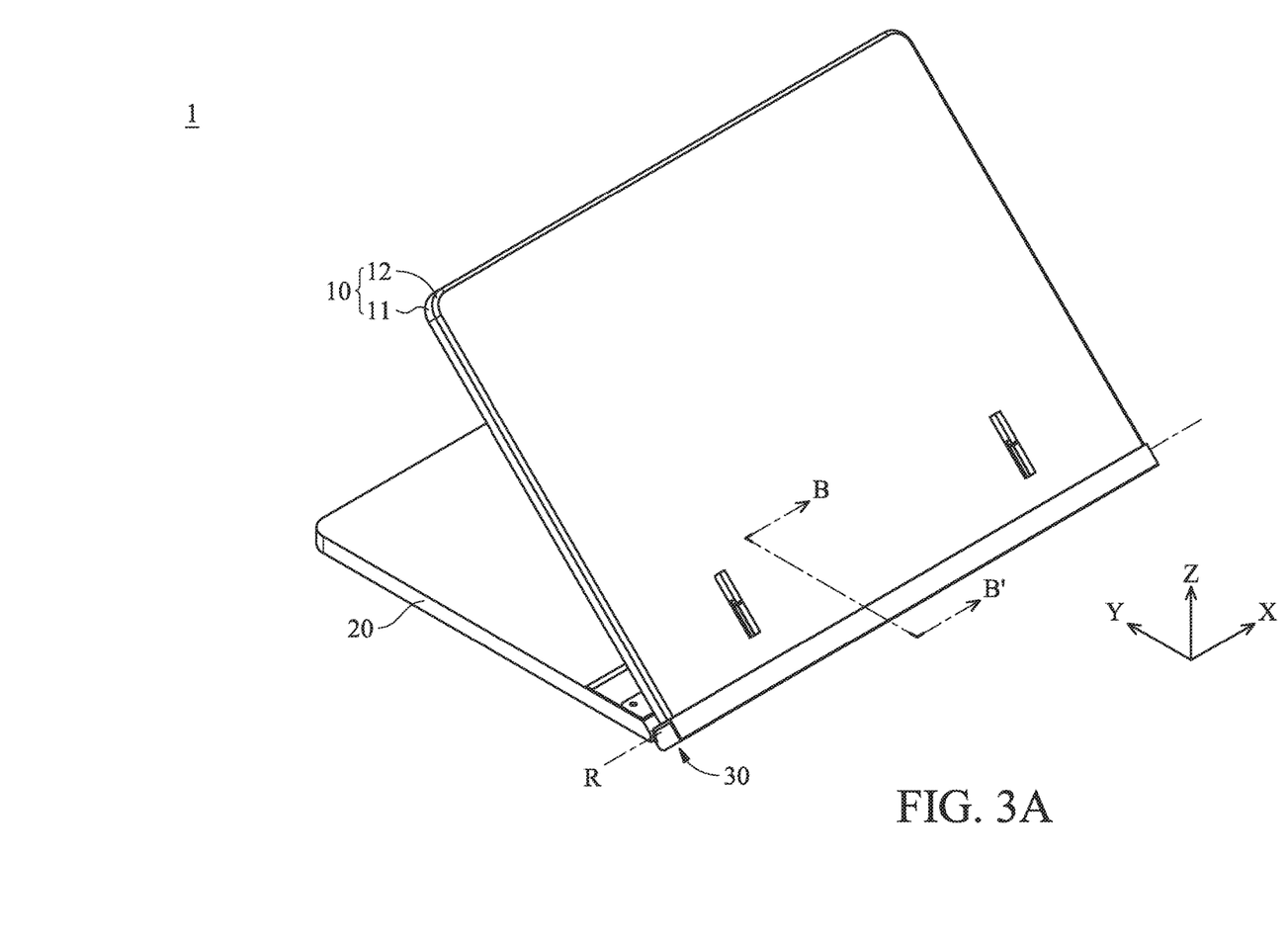
FIG. 3A is a schematic diagram of the portable electronic device open at an angle of 45°.
Figure 3B:
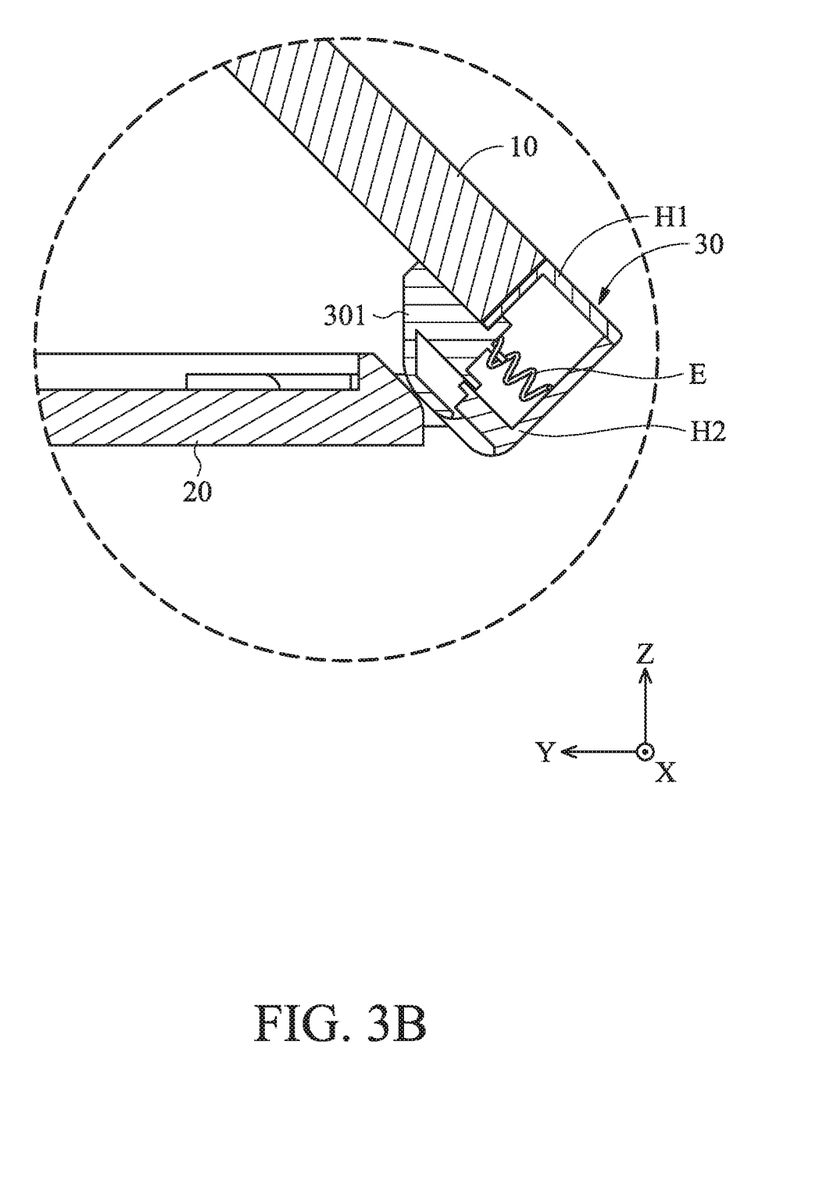
FIG. 3B is sectional view diagram taken along line B-B' in FIG. 3A.

Referring to FIGS. 3A-3B, FIG. 3A is a schematic diagram of the portable electronic device 1 when the portable electronic device 1 is open at an angle of 45°. FIG. 3B is a schematic cross-sectional view taken along line B-B' in FIG. 3A. When the display unit 10 and the hinge mechanism 30 are rotated relative to the input unit 20 to make the portable electronic device 1 open (in 45°), the stopper 301 is disengaged from the recess S, and the elastic element E exerts an elastic force on the stopper 301, so that the stopper 301 slides from the initial position to the outer side (outside) direction relative to the housings H1 and H2, and the stopper 301 is pushed out of the housing H1 and partially covers the display unit 10. Therefore, the overlap area between the stopper 301 and the display unit 10 is increased.

Figure 3C:
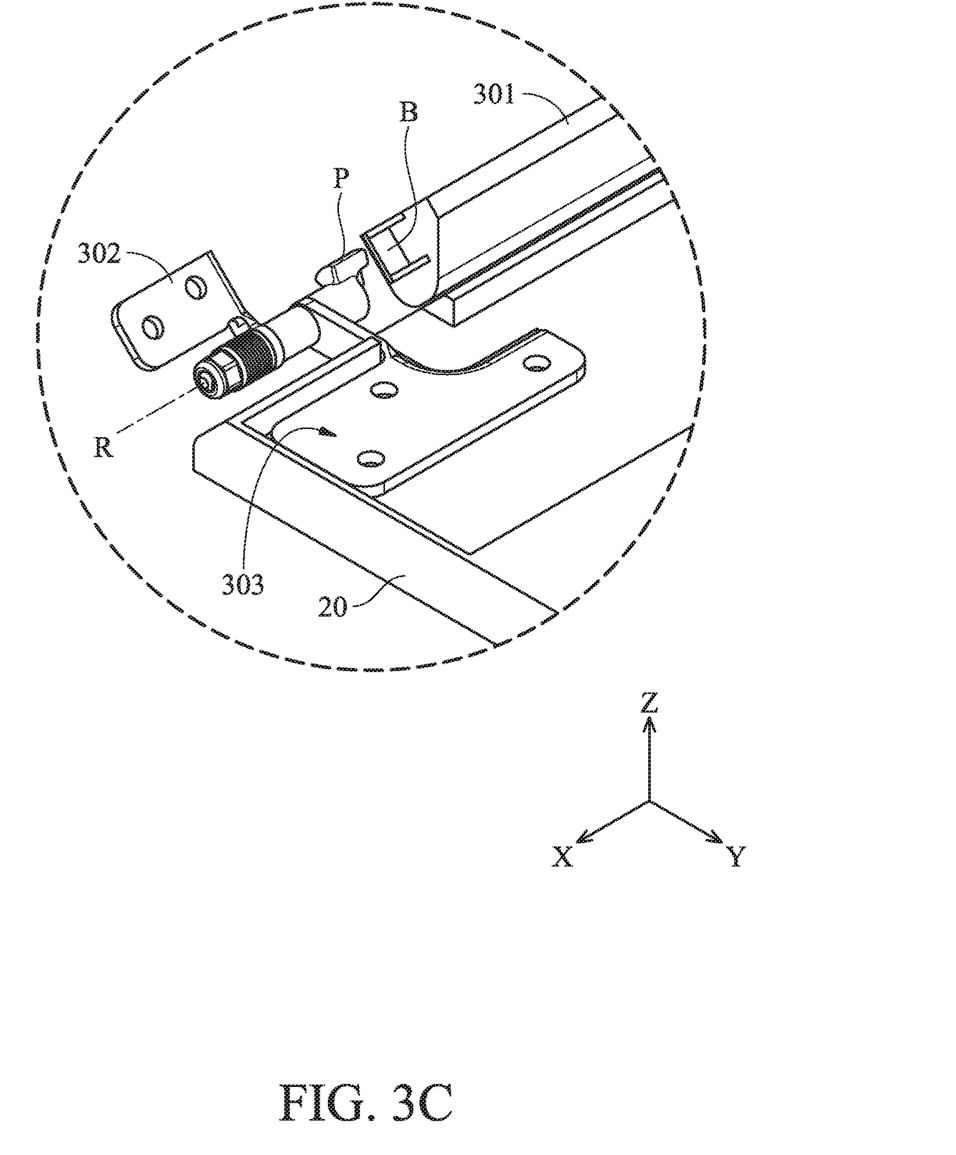
FIG. 3C is a schematic diagram of the connection between the hinge mechanism and the input unit of the portable electronic device after the display unit and the housing have been removed.

Please refer to FIG. 3C, which is a schematic view showing the connection between the hinge mechanism 30 and the input unit 20 of the portable electronic device 1 in FIG. 3A after the display unit 10 and the housings H1 and H2 are removed. As shown in FIG. 3C, the protrusion B of the stopper 301 is closer to the protruding structure P with respect to the protrusion B in the closed state (FIGS. 2A to 2C), and the movable member 302 is in a tilted state.

Figure 4A:
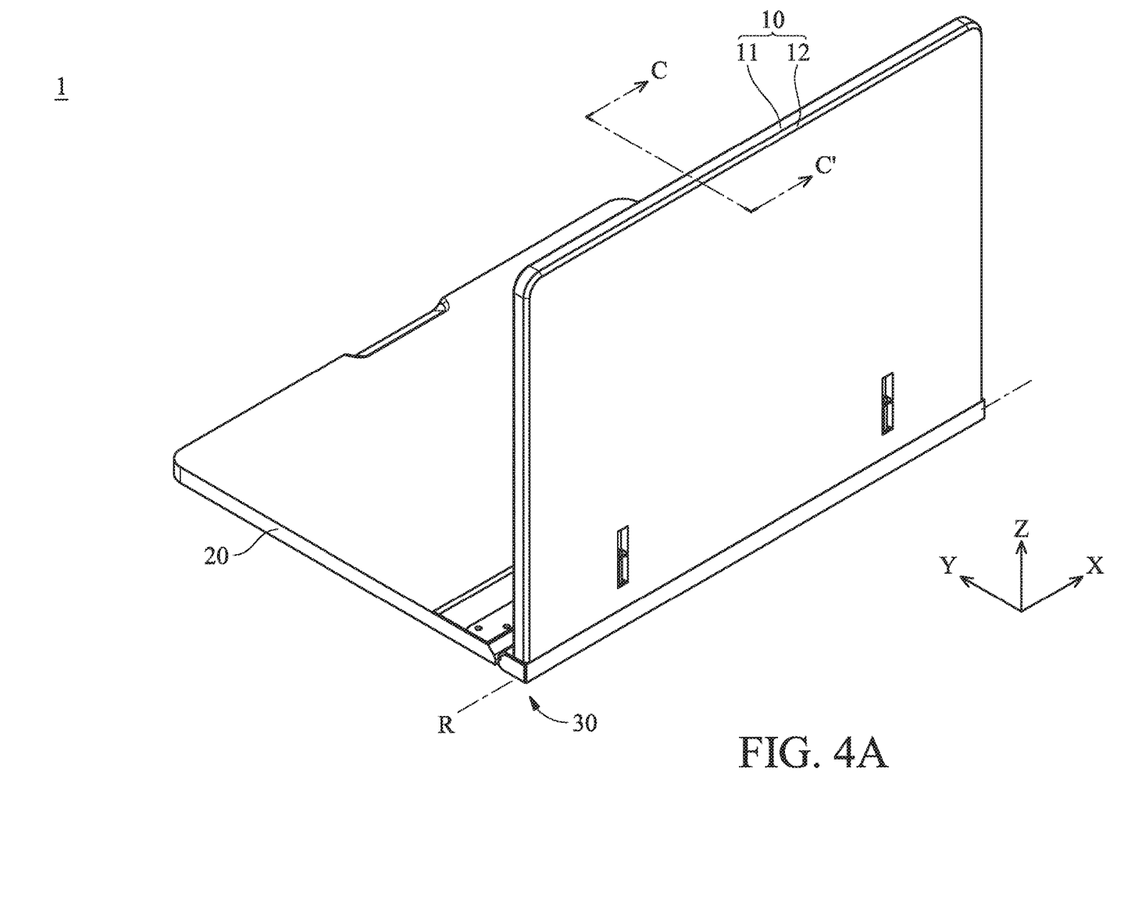
FIG. 4A is a schematic diagram of the portable electronic device when the electronic device is turned to an angle of 90°.
Figure 4B:
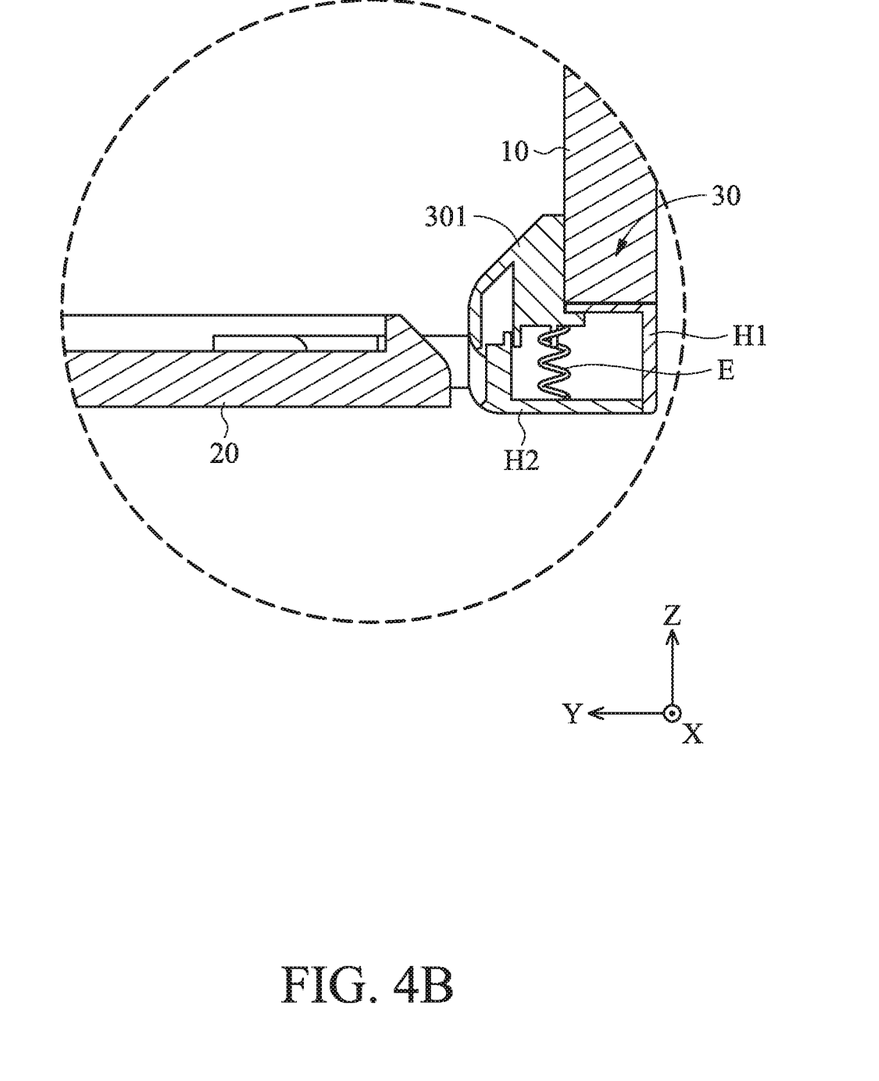
FIG. 4B is cross-sectional view diagram taken along line C-C' in FIG. 4A.

Referring to FIGS. 4A to 4B, FIG. 4A shows a perspective view of the portable electronic device 1 in the open state with an angle of 90° (rotating to 90°), and FIG. 4B shows a schematic cross-sectional view taken along line C-C' in FIG. 4A. When the portable electronic device 1 is in this open state (90°), the stopper 301 and the display unit 10 are perpendicular to the input unit 20. Therefore, the fixed effect between the display unit 10 and the hinge mechanism 30 can be enhanced by the stoppers 301 in an upright position, and the shaking between the display unit 10 and the latch C of hinge mechanism 30 (when they are combined) can be avoided.

Figure 4C:
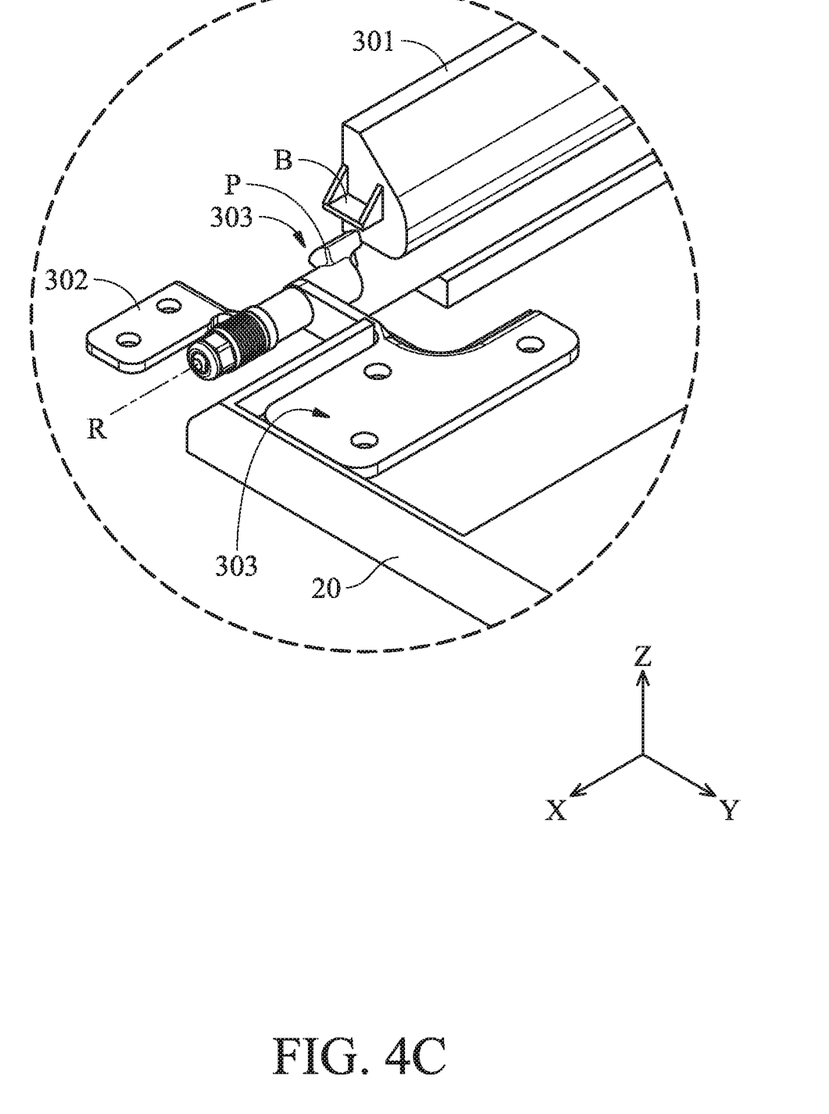
FIG. 4C is a schematic diagram of the connection between the hinge mechanism and the input unit of the portable electronic device after the display unit and the housing have been removed.

Please refer to FIG. 4C, which illustrates a schematic diagram of the connection between the hinge mechanism 30 and the input unit 20 of the portable electronic device 1 in FIG. 4A and with the housings H1, H2 removed. When the portable electronic device 1 is opened at an angle of 90°, the movable member 302 is in a horizontal state, and the protrusion B of the stopper 301 faces the curved surface of the protruding structure P, wherein the protruding structure P is located between the protrusion B and the rotation axis R in the radial direction of the rotation axis R. In addition, in this embodiment, the design of the curved surface of the protruding structure P can ensure that the portable electronic device 1 can be used normally even when the portable electronic device 1 is opened (rotated) wider than 90°, and the stopper 301 can avoid being pressed into the housing H1 by providing the protruding structure P, so that the fixing effect between the display unit 10 and the hinge mechanism 30 can be enhanced.

Figure 5:
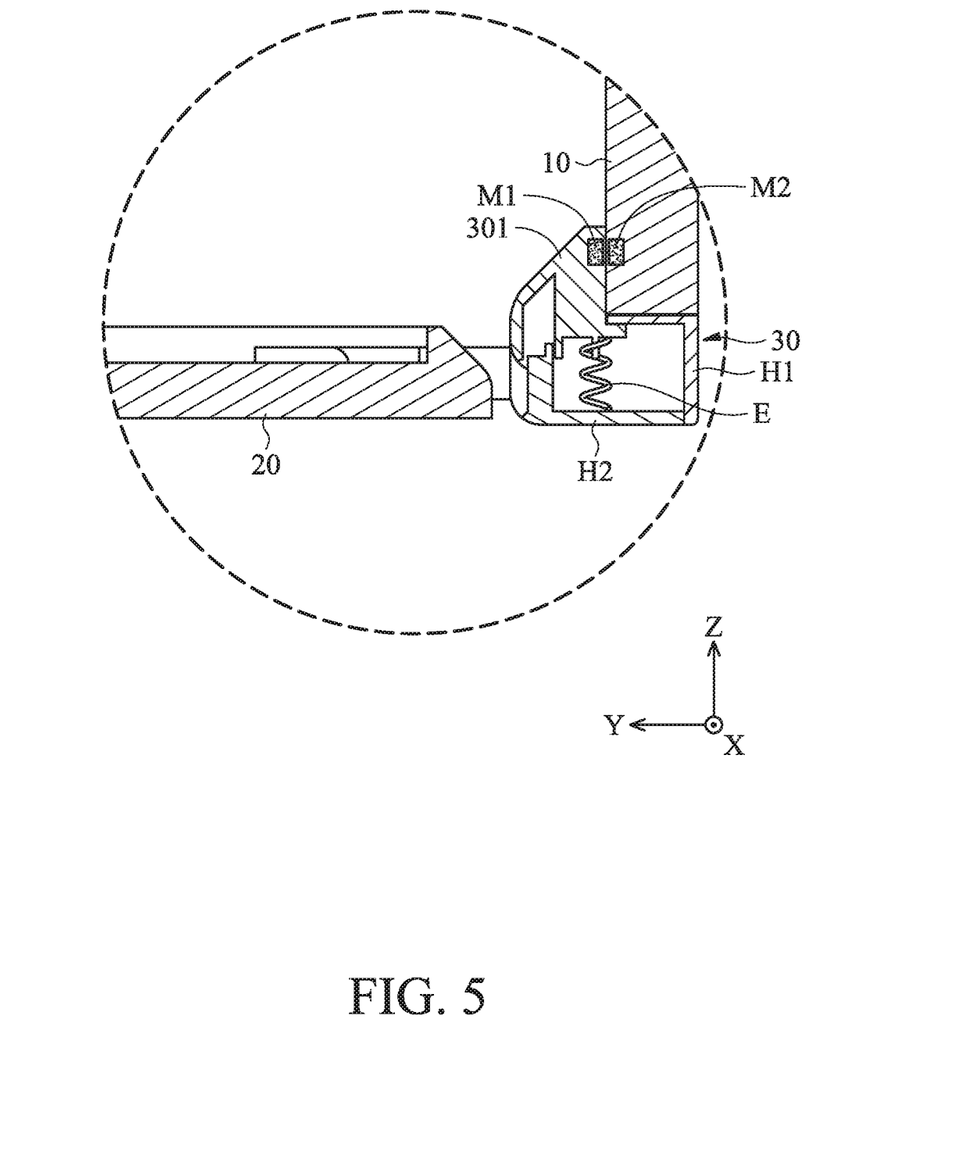
FIG. 5 is a schematic diagram of a portable electronic device when the electronic device is turned to an angle of 90° according to another embodiment of the invention.

Please refer to FIG. 5, which is a cross-sectional view of the portable electronic device 1 when it is turned 90° according to another embodiment of the present invention. In this embodiment, the portable electronic device 1 further comprises a first magnetic element M1 (such as a magnet)

disposed on the stopper 301 and a second magnetic element M2 (such as a magnet) disposed on the display unit 10. When the portable electronic device 1 is in the open state, the first magnetic element M1 and the second magnetic element M2 will attract each other, wherein by using the force of attraction between the magnetic elements, the fixing and positioning effect between the display unit 10 and the hinge mechanism 30 can be further enhanced.

In summary, the portable electronic device of the above embodiments of the present invention can effectively solve the problem of the touch display screen (tablet computer) and the connecting mechanism being easily shaken, and of the connecting mechanism being exposed when the touch display screen is connected to the connecting mechanism. The aesthetics and stability of the portable electronic device can thereby be greatly improved.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A portable electronic device, comprising:
    a display unit;
    an input unit; and
    a hinge mechanism, detachably connected to the display unit and pivotally connected to the input unit, wherein the hinge mechanism has a housing, a stopper and an elastic element, and the elastic element connects the housing to the stopper,
    wherein when the portable electronic device is in a closed state, the stopper is in an initial position relative to the housing, and when the display unit and the hinge mechanism are rotated relative to the input unit around a rotation axis so that the portable electronic device is in an open state, the elastic element exerts an elastic force on the stopper, and the stopper slides to an outer side relative to the housing from the initial position and partially covers the display unit.

2. The portable electronic device as claimed in claim 1, wherein when the portable electronic device is in the closed state, at least a portion of the stopper is in a recess which is formed by the input unit and the display unit.

3. The portable electronic device as claimed in claim 2, wherein the stopper has a wedge-shaped structure corresponding to the recess.

4. The portable electronic device as claimed in claim 1, wherein the hinge mechanism further has a movable member and a fixing member, the movable member is affixed to the housing, and the fixing member is affixed to the input unit, wherein the fixing member has a protruding structure and the stopper has a protrusion, and the protruding structure is located between the protrusion and the rotation axis in a radial direction of the rotation axis when the portable electronic device is in the open state.

5. The portable electronic device as claimed in claim 4, wherein the protrusion protrudes from a side surface of the stopper.

6. The portable electronic device as claimed in claim 4, wherein when the portable electronic device is in the closed state, the protrusion and the protruding structure are separated by a distance.

7. The portable electronic device as claimed in claim 4, wherein the protruding structure has a curved surface corresponding to the protrusion.

8. The portable electronic device as claimed in claim 1, wherein the hinge mechanism further has a latch that protrudes from the housing and is detachably connected to the display unit.

9. The portable electronic device as claimed in claim 1, wherein the display unit is a tablet computer.

10. The portable electronic device as claimed in claim 1, further comprising a first magnetic element and a second magnetic element respectively disposed on the stopper and the display unit, and the first and second magnetic elements attract each other when the portable electronic device in the open state.

* * * * *